REPRESENTATIVE EQUILIBRIUM GAS COMPOSITIONS FOR THE HYDROCARBON-STEAM REACTION IN THE PRESENCE OF A NICKEL CATALYST AT CONSTANT PRESSURE OF 25 ATMOSPHERES, AT VARIOUS TEMPERATURES AND AT TWO DIFFERENT STEAM/DISTILLATE RATIOS.

United States Patent Office 3,531,267
Patented Sept. 29, 1970

3,531,267
PROCESS FOR MANUFACTURING FUEL
GAS AND SYNTHESIS GAS
George D. Gould, Orinda, Calif., assignor to Chevron Research Company, San Francisco, Calif., a corporation of Delaware
Filed June 17, 1965, Ser. No. 464,620
Int. Cl. C01b 2/14; C10g 13/00, 13/30
U.S. Cl. 48—213                                                     18 Claims

ABSTRACT OF THE DISCLOSURE

A process for producing a valuable gas from a hydrocarbon distillate containing organic sulfur compounds which comprises:
(a) catalytically hydrocracking said distillate at a temperature between 500 and 800° F., by contacting a mixture of said distillate and hydrogen with a catalyst containing a hydrogenation-dehydrogenation component to obtain an effluent stream comprised of effluent hydrocarbons and hydrogen sulfide,
(b) separating the hydrogen sulfide from at least a portion of the effluent hydrocarbons to obtain a hydrocarbon stream of low sulfur content, and
(c) steam reforming at least a portion of the hydrocarbon stream of low sulfur content.

INTRODUCTION

This invention relates to a process for the conversion of hydrocarbon distillates into valuable gases. More particularly, the invention relates to a multistage process including a hydrocracking stage for converting hydrocarbon distillates to valuable gases, including fuel gases and synthesis gases. The invention will be described below primarily in connection with its use for fuel gas production.

GEOGRAPHICAL REQUIREMENTS FOR FUEL GASES OF VARIOUS TYPES AND CHARACTERISTICS

(A) United States requirements

In the United States fuel gas for appliances such as household gas furnaces and gas stoves is largely natural gas rather than manufactured gas. While specific gravity and composition of natural gas are variable, natural gas always consists largely of methane, and always has a high heating value, as defined below, of around 1000 B.t.u. per cubic foot. For example, a representative natural gas supplied by a Western United States utility for home use has a specific gravity of 0.629 and has the following composition in volume percent:

| | |
|---|---|
| $CH_4$ | 88.12 |
| $C_2$ | 7.72 |
| $C_3$ | 1.95 |
| $C_4$ | 0.21 |
| $C_5$ | 0.02 |
| $N_2$ | 1.04 |
| $CO_2$ | 0.94 |
| Total | 100.00 |

Because of the prevalence of the natural gas supply in the United States, gas appliances, burners, nozzles, injectors, etc. are designed and adjusted for use with gases having heating values, flame speeds, and other characteristics of natural gas rather than manufactured gas.

(B) Heating values of gases

The gross heating value of calorific value of a gas is the gross amount of heat that will be evolved by the combustion of a defined quantity of the gas under defined combustion conditions. This value conventionally is expressed in the United States in B.t.u. per cubic foot of gas, and in many European countries and elsewhere in kilocalories per cubic meter of gas, the latter being obtainable by dividing B.t.u. per cubic foot by 0.11.

The gross heating value prior to combustion may be calculated on either a saturated basis or a dry basis. The gross heating value of a given volume of gas prior to combustion is higher if that volume of gas is dry rather than saturated, because in the latter gas the water vapor adds to the volume. For example, the aforesaid representative natural gas has a gross heating value of 1090 B.t.u. per cubic foot, measured on a dry basis prior to combustion. When measured on a saturated basis, the gross heating value is 1-2% lower. The methane component of the same gas has a gross heating value of 1015 B.t.u. per cubic foot measured on a dry basis prior to combustion.

The aforesaid gross heating value in B.t.u. per cubic foot of a gas is the gross heat energy in B.t.u.'s released by complete combustion of a cubic foot of the gas, including latent heat energy contained in water vapor created during combustion. That is, any water formed during combustion is assumed to be liquid at the outlet temperature, so that it has not retained heat of vaporization. Heat required to maintain such water in vapor form, to heat flue gases, etc., must be subtracted from the gross heating value to obtain the net heating value.

A large amount of water is formed during combustion of fuel gas. In the case of natural gas this may be of the order of one gallon of water per 100 cubic feet of gas. In this case approximately 10% of the gross heat energy released by combustion of the gas is required as latent heat of vaporization of the water so that it can be vented without condensing. A further portion of the gross heat energy is needed to heat flue gases so that they can be vented. The remainder is the net heating value of the gas, or the heating value on a net basis. Unless specifically indicated to the contrary, the heating values given hereinafter are on a gross, saturated basis.

Representative heating values in B.t.u.'s per cubic foot on a saturated basis of various gaseous compounds and gaseous mixtures are as follows:

| | Gross | Net |
|---|---|---|
| $H_2$ | 318 | 269 |
| $CH_4$ | 994 | 896 |
| $C_2H_6$ | 1,758 | 1,610 |
| $C_3H_8$ | 2,519 | 2,319 |
| $C_4H_{10}$ | 3,332 | 3,078 |
| CO | 315 | 315 |
| $CO_2$ | 0 | 0 |
| Refinery gas | 1,250 | 1,060 |
| Natural gas (90–96% $CH_4$) | 1,030 | 875 |
| Manufactured gas containing 40 vol. percent $H_2$; 33 vol. percent CO; 12 vol. percent $CO_2$; 4 vol. percent $N_2$; 8 vol. percent $CH_4$ | 346 | 294 |

(C) Requirements in manufactured gas countries

In contrast with the gas industry in the United States, which is geared to the use of high heating value natural gas because of its large supplies of natural gas, the situation is otherwise in many other countries, including many European and Asiatic countries, two important cases in point being the United Kingdom and Japan. Because neither the United Kingdom nor Japan has large supplies of natural gas, they must rely upon manufactured gas for their domestic requirements. The gross heating value requirements for fuel gas in the United Kingdom and Japan are on the order of 500 B.t.u. per cubic foot, rather than on the order of 1,000 B.t.u. per cubic foot as in the United States. In the United Kingdom in particular, this requirement for 500 B.t.u. per cubic foot gas, that is, medium heating value fuel gas, is largely dictated by the burner design standards of existent appliances, which are a continuance of standards related to the long British use of coal gas. The fuel gas in such manufactured gas countries is often called "town gas" and may be considered as consisting of three main constituents: (a) a lean gas consisting mainly of hydrogen, (b) a rich gas consisting of a hydrocabon or a mixture of hydrocarbons and (c) a ballast or diluent gas consisting of inert gases, e.g., nitrogen and carbon dioxide.

In countries having gas appliances requiring a 500 B.t.u. per cubic foot gross basis town gas, the requirement is not met simply by meeting the heating value requirement, unless the gas has proper burning characteristics that are defined in terms of the Wobbe number, W, and the flame speed, S. As will be discussed later herein in connection with FIG. 4, a satisfactory town gas for a particular burner adjusted for satisfactory operation with a particular adjustment gas must lie in a certain area of a diagram upon which Wobbe number is plotted against flame speed. The Wobbe number W is calculated by dividing CV, the calorific value or heating of the gas in B.t.u., by the square root of SG, the specific gravity of the gas relative to air. The significance of W is that gases of equal Wobbe number pass through the same orifice at the same temperature and pressure and burn to release heat at the same rate. The flame speed S is the maximum flame speed of a gas in air expressed as a percentage of the maximum flame speed of hydrogen in air. The significance of the flame speed is that it must be properly related to the Wobbe number of a particular gas being burned in a burner adjusted for another particular gas in order to prevent incomplete combustion, lifting of the flame too far off the burner, or lighting back of the flame into the burner. Hydrogen has a very high flame speed, or burning velocity, and heating value of around 320 B.t.u. per cubic foot, whereas natural gas consisting largely of methane has a flame speed about $\frac{1}{10}$ that of hydrogen and a heating value of over 1000 B.t.u. per cubic foot. Traditional manufactured town gas has a heating value around 500 B.t.u. per cubic foot and a flame speed lying between the flame speeds of natural gas and hydrogen. Representative values of W and S for various gaseous compounds and gaseous mixtures are given in FIG. 4 herein. It is generally necessary to use aerated burners when burning a slow burning natural gas, whereas non-aerated burners can be used when burning town gas.

PRIOR ART METHODS OF MANUFACTURING TOWN GAS AND SYNTHESIS GAS

(A) Gasification processes, general

Hydrogen is the ideal lean gas for use in making town gas, because it has a low specific gravity and a high flame speed. It is also important in the synthesis of various gases, particularly ammonia. Town gases of many different desired combinations of characteristics can be made by adding to hydrogen various quantities of gaseous hydrocarbons, to raise the B.t.u. content and lower the flame speed, and various quantities of diluent gas to lower the Wobbe number and lower the flame speed. Methane is one of the ideal gases to add to hydrogen to raise the B.t.u. content, because it has the lowest flame speed of the gaseous hydrocarbons. Accordingly, gasification processes are important in the production of hydrogen for synthesis gas or as a town gas ingredient, and are important in the production of methane, particularly as a town gas ingredient.

There are many processes for the gasification of hydrocarbons to produce hydrogen-rich, methane-lean gas for synthesis gas use or for use in making town gas by enrichment with methane, and there are many processes for the gasification of hydrocarbons to produce methane-rich gas for use as the enriching gas in town gas manufacture. These processes are variously catalytic or non-catalytic, and the catalytic ones may be either continuous, with no necessity for shutdowns for catalyst regeneration is necessary.

The main hydrocarbon gasification processes of interest, for purposes of the present invention are the following:
(1) Steam reforming:
(a) operated under severe reforming conditions to produce a hydrogen-rich gas (e.g. ICI Process, described below)
(b) operated under mild reforming conditions to produce a methane-rich gas (e.g. CRG Process, described below)
(2) Thermal hydrocracking, to produce a methane-rich gas (e.g. GRH Process, described below):
(a) operated without a coke bed or catalyst
(b) operated with a fluidized coke bed so that carbon deposition can be controlled by periodic solids withdrawal
(c) operated with a hydroforming catalyst to influence the reaction, which however remains largely thermal hydrocracking rather than catalytic hydrocracking at the low pressures and high temperatures involved. Steam is used to control coke laydown on the catalyst.

Other gasification processes which under appropriate circumstances, which will be apparent from the present disclosure, may be used in the process of the present invention, include the partial oxidation processes. In these processes a gaseous or liquid hydrocarbon feed is partially oxidized, using oxygen or air with light feeds or steam with heavy feeds, generally in the presence of a catalyst. Pressures are 100 to 3000 p.s.i.g., and temperatures are 1800° to 3500° F. The product is predominantly hydrogen and carbon monoxide, for example 47–60 vol. percent hydrogen and 38–40 vol. percent carbon monoxide. When a catalyst is used it may be iron. These processes are well known in the literature, and varieties thereof have been developed by both Shell and Texaco.

(B) Steam reforming processes

(a) General: In the steam reforming process, at elevated temperatures, at atmospheric or higher pressures, and in the presence of a catalyst, commonly a supported nickel catalyst, hydrocarbons react with steam to give a gas comprising hydrogen carbon oxides, and methane, the composition of the gas depending upon the reaction conditions.

(b) Reactions: The basic equilibrium reactions in the steam reforming zone of the steam reforming process are:

(1) Hydrocarbon-steam— equilibrium:  $C_nH_{2n+n} + nH_2O \rightleftharpoons nCO + (2n+1)H_2$ e.g. methane-steam:  $CH_4 + H_2O \rightleftharpoons CO + 3H_2$
(2) Water gas shift— equilibrium:  $CO + H_2O \rightleftharpoons H_2 + CO_2$

If the amount of steam present is low enough, theoretically less than two molecules of steam per atom of carbon in the hydrocarbon reactant, two further equilibrium reactions occur, each resulting in the formation of carbon:

(3)  $2CO \rightleftharpoons CO_2 + C$
(4)  $CH_4 \rightleftharpoons 2H_2 + C$

Carbon dioxide may be used as a reactant, to cause two further equilibrium reactions:

(5)  $CO_2 + CH_4 \rightleftharpoons 2CO + 2H_2$
(6)  $CO_2 + 4H_2 \rightleftharpoons CH_4 + 2H_2O$ A steam reformer can be operated under severe conditions to maximize the hydrogen content of the product gases, or under mild conditions to maximize the methane content of those gases, as discussed immediately below and in connection with FIG. 3.

(c) Limitations on the steam reforming process: Two inherent characteristics of the steam reforming process heretofore have severely limited use of the process, and a removal of these limitations is a major advantage of the process of the present invention. These limitations are:

(1) The steam reforming catalyst is sulfur sensitive, and steam reformer feedstocks must have a low sulfur content, for example below 5 p.p.m. sulfur, preferably below 1 p.p.m. Heretofore it has been necessary to achieve the necessary low level by means of expensive feed desulfurizing units which largely accomplished no other useful purpose.

(2) The steam reformer is limited in the boiling range of the hydrocarbon distillate feedstocks it can handle effectively, and these end points typically must be below about 450° F., preferably below 400° F., and even more preferably below 350° F. This limitation has restricted the feedstocks that a manufactured gas producer could profitably purchase.

(d) Steam reforming under severe conditions: The steam reforming process operating under severe conditions to produce a hydrogen-rich gas has been extensively developed by Imperial Chemical Industries (ICI) and various aspects of the process are discussed in many patent references, including the following:

ICI U.S. Patents 3,103,423, 3,063,936
ICI Belgian Patents 632,913, 643,039
ICI Canada Patents 692,115, 692,117
ICI British Patent 953,877

The ICI steam reforming process when operated under severe reforming conditions produces from a hydrocarbon distillate feedstock having an end point below about 450° F. a hydrogen-rich gas having a calorific value of around 300 to 350 B.t.u. per cubic foot. It uses a steam reformer operated with a nickel-based catalyst, for example nickel on alumina. The severe reforming conditions include a relatively high steam to hydrocarbon distillate ratio sufficient to prevent carbon formation at the relatively high temperatures involved, for example 2 to 6 pounds of steam per pound of distillate, a relatively low pressure, for example 0 to 400 p.s.i.g., and a relatively high exit temperature, for example 700° to 900° C. (1292° to 1652° F.). A representative product gas from this operation has the following composition, in volume percent:

$CH_4$ ---------------------------------------- 9–12
$CO$ ----------------------------------------- 11–16
$CO_2$ ---------------------------------------- 14–16
$H_2$ ----------------------------------------- 61–63

The methane content of the product from the steam reformer operated under severe conditions, as defined above, can lie in the range 0.5–13 vol. percent. To approach the bottom of this range requires increased temperatures and increased steam to distillate ratio, which are expensive. Accordingly, when operating to produce a methane-lean gas for fuel gas manufacture, because a substantial amount of methane can be tolerated in the lean gas, the process is not operated to reduce the methane content to the lower possible levels. And when operating to produce a synthesis gas for ammonia production, which does require a very low methane content reformer product gas, it is frequently more economical and more efficient not to reduce the methane content to a low level in the steam reformer, but to produce therein a gas having a methane content of around 10%, and to reduce the methane content of this gas, for example to 0.3% in a secondary air reformer using a nickel catalyst. In the air reformer the reaction of the steam reformer product gas with oxygen is exothermic, and the resulting temperatures rises to a level where the methane decomposes to hydrogen and carbon. Where the subsequent use of the air reformer product gas is for ammonia manufacture, it is frequently convenient and desirable to introduce the necessary nitrogen into the air reformer. The air reforming reaction with nitrogen is:

$$CH_4 + \tfrac{1}{2}(O_2 + 3.78 N_2) \rightarrow CO + 2H_2 + 1.89 N_2$$

(e) Steam reforming under mild conditions: The steam reforming process operating under mild conditions to produce a methane-rich gas has been applied by the British Gas Council in the development of its Catalytic Rich Gas process (CRG process), and various aspects of the process are discussed in many patent references, including the following:

British Gas Council:
　Belgian Patent 645,239
　British Patent 981,726
　Belgian Patent 644,673
　German pat app. Ser. No. 1,180,431
　So. Africa Patent 63/3388

The British Gas Council CRG process when operated under mild reforming conditions produces from a hydrocarbon distillate feedstock having an end point below about 450° F. a methane-rich gas having a calorific value of around 600–800 B.t.u. per cubic foot. It uses a steam reformer operated with a nickel-based catalyst, for example nickel on alumina. The mild reforming conditions include a relatively low steam to hydrocarbon distillate ratio sufficient to prevent carbon formation at the relatively low temperatures involved, for example 1 to 5 pounds of steam per pound of distillate, a relatively high pressure, for example 140 to 500 p.s.i.g., and a relatively low exit temperature, for example 500° to 600° C. (932° to 1112° F.), preferably 500° to 550° C. (932° to 1022° F.). A representative product gas from this operation has the following composition, in volume percent:

$CH_4$ ---------------------------------------- 59–62
$CO_2$ ---------------------------------------- 20–24
$CO$ ----------------------------------------- 0.7–2
$H_2$ ----------------------------------------- 13–16

The product gas from the CRG process can be purified if desired to remove $CO_2$ and to convert $CO$ to methane, to produce a high calorific value fuel gas having a heating value above 800 B.t.u. per cubic foot.

(C) Thermal hydrocracking processes (a) General: It is known that thermal hydrocracking processes, or hydrocracking processes accomplished without the influence of a catalyst, produce large quantities of methane, and therefore have utility in fuel gas manufacture.

(b) Reactions and conditions: Conventional thermal hydrocracking processes are operable to convert hydrocarbon feedstocks boiling over a wide range. They may operate at temperatures of 750° to 1650° F., more commonly 825° to 950° F., and at pressures from 800 to 3500 p.s.i.g., with a large hydrogen supply, for example 2000 to 15,000 s.c.f. per barrel of liquid hydrocarbon feed. The higher temperatures are needed with the lighter feedstocks, and very heavy feedstocks may be processed at the lower temperatures. The reactions include thermal cracking and hydrogenation, and a large production of light gases including methane is characteristic, in large part because of the elevated temperature necessary to accomplish cracking in the absence of a catalyst. Steam may be introduced into the reaction zone to control coke laydown on vessel interiors.

(c) Gas recycle hydrogenator process: The British Gas Council's Gas Recycle Hydrogenator process (GRH process) has been successfully used in producing from light petroleum distillates a methane-rich gas product having great utility in fuel gas manufacture. The process is in effect thermal hydrocracking, and is conducted at a high temperature from 425° to 900° C. (797° to 1652° F.) and a low pressure from 50 to 750 p.s.i.g., in the presence of a hydrogenation gas, or "lean gas." The hydrogenation gas reacts with the distillate in an exothermic reaction, to produce gaseous hydrocarbons, mainly methane and ethane. The product gases are formed from (a) paraffins in the petroleum distillate, and (b) sidechains of aromatics in the distillate; the aromatic nucleus is unaffected. Aromatics are separated from the product gases, and in fact a high quality benzole by-product may be obtained. The hydrogenation gas may be substantially pure hydrogen, or a gas consisting predominantly of hydrogen, such as the product gas from an ICI steam reformer. Hydrogen is supplied at a rate sufficient to satisfy the hydrogen consumption requirements; the rate may be 25 to 100 cubic feet of hydrogen per gallon of hydrocarbon oil. The Gas Recycle Hydrogenator reactor may contain a fluidized coke bed, particularly when heavier oils are being processed. In this case any carbon that may be deposited on the coke particles from the cracking reaction increases the volume of the bed, which may be maintained constant by periodic withdrawal of coke particles from the bed. An active hydroforming catalyst can be used with lighter oils, in which case steam injection may be used to control coke laydown on the catalyst. Localized hot spots in the solids bed, which would lead to excessive carbon deposition, may be controlled by rapid recirculation of gases within the reactor. The gaseous product from the reaction may comprise 20 to 40 vol. percent hydrogen and 30 to 70 vol. percent methane and ethane, and has a heating value which is generally above 1000 B.t.u. per cubic foot. This gas must be diluted with appropriate gases to lower the heating value for use in areas requiring fuel gas of medium rather than high heating value. The process is extensively described in the literature, for example various aspects thereof are described in the following patents:

British Gas Council:

British Patents 830,960, 899,574
Belgian Patent 635,755

GAS PURIFICATION

(A) When purification necessary (a) General: There are many conventional processes for the purification of gases to reduce the CO and $CO_2$ content thereof. It is generally necessary to use one or more of these processes to purify gases from gasification processes, and particularly gases from steam reforming processes. The type and extent of purification depends upon the ultimate use that it is to be made of the gases from the gasification processes. These ultimate uses are varied, as discussed below.

(b) Need for reducing CO content: It is necessary to reduce the CO content of gases produced by gasification processes when the final gas must consist of substantially pure hydrogen, as when it is to be used as a synthesis gas for ammonia production, when it is to be used as a lean gas with a high flame speed and high Wobbe number in fuel gas manufacture, when it is to be used as at least a portion of the hydrogen supply to a hydrocracking zone, and when it is to be used for other purposes requiring substantially pure hydrogen. For ammonia production, for example, a steam reforming process operating under severe conditions may be used to produce a hydrogen-rich gas, which may be reacted in a secondary air reformer to further reduce the methane content of the gas, all as discussed above. The hydrogen-rich gas from the secondary air reformer may be subjected to various purification steps to produce a hydrogen-rich synthesis gas, which may be compressed and used in the conventional ammonia synthesis reaction: $3H_2+N_2\rightarrow 2NH_3$. In the latter reaction the relatively pure hydrogen and nitrogen react at a high temperature, for example 550°–600° C. and a high pressure, for example 100–200 atmospheres, over a catalyst such as $Fe-Al_2O_3-K_2O$ to produce an ammonia product. For methanol production it is generally unnecessary to reduce the CO content of a gas from a gasification process, because it is necessary that methanol synthesis gas contain CO as well as hydrogen for the reaction $CO+2H_2\rightarrow CH_3OH$. Desirably such methanol synthesis gas should have a ratio of $H_2$ to CO of about 2.2:1. In the methanol synthesis step the CO reacts with hydrogen at a high pressure of 100–200 atmospheres and a temperature of 300°–600° C. over an appropriate catalyst. If the catalyst is zinc oxide the reaction equilibrium favors methanol production. If the catalyst is cobalt metal with chromium oxide the reaction equilibrium favors light hydrocarbons instead of methanol.

(c) Need for reducing $CO_2$ content: Because of the inert nature of $CO_2$ it is generally necessary to reduce the $CO_2$ content of a gas from a gasification process, regardless of the ultimate use that is to be made of the gas. It is necessary for ammonia synthesis gas, methanol synthesis gas, and hydrogen for hydrocracking reactions to have a very low $CO_2$ content. Manufactured fuel gas may have a larger, but still minor, $CO_2$ content.

(B) Methods of gas purification

(a) Removal of $CO_2$: $CO_2$ may be removed from gases produced by gasification processes by various methods including mono ethanol amine absorption, and the conventional Vetrocoke process using arsenic activated potassium carbonate solution, which can reduce the $CO_2$ content of a gas to less than 0.1% in a single stage.

(b) Conversion of CO by shift conversion or methanation: The CO in gases from gasification processes can be reacted with $H_2O$ to produce $CO_2$ and $H_2$ at a low temperature of 450°–500° F. which favors hydrogen production, in the presence of a suitable catalyst such as a promoted iron oxide catalyst. The equilibrium reaction that occurs is the water gas shift equilibrium or water gas catalytic reaction frequently termed "shift conversion" or "CO shift conversion" to indicate that the equilibrium is shifted from CO to $CO_2$. In the conventional reaction the CO content of gases from gasification processes can be reduced as low as 0.3% in a single stage.

The CO content of gases from gasification processes also may be reduced by conversion of the CO to methane in the conventional methanation reaction $$CO+3H_2\rightarrow CH_4+H_2O$$

(c) Conversion of $CO_2$ by methanation: The $CO_2$ content of gases from gasification processes may be reduced by the conventional methanation reaction $$CO_2+4H_2\rightarrow CH_4+2H_2O$$

in the presence of a conventional methanation catalyst, for example non-sulfided nickel, platinum or palladium on a non-cracking support.

(d) Final purification: Gases from gasification processes that have been subjected to one or more purification steps such as $CO_2$ removal, shift conversion of CO to $CO_2$, conversion of CO to methane by methanation, or conversion of $CO_2$ to methane by methanation, may be given a final purification treatment to remove trace amounts of CO and $CO_2$ if desired. Such final purification treatment may be any process that will *physically remove* CO and $CO_2$, *or* that will *convert* them to compounds that won't damage subsequent ammonia synthesis or other catalysts. Accordingly, such final purification treatment may be any conventional treatment such as copper liquid washing, which is preferred, to methanation, or liquid nitrogen washing.

CATALYTIC HYDROCRACKING

(A) Process and catalyst (a) General: Catalytic hydrocracking is a well known conventional process that has developed into widespread commercial use in recent years. It is discussed in various of its aspects in many patent references, for example Scott U.S. Pat. No. 2,944,006. As used in connection with the present invention catalytic hydrocracking in various of its aspects is intended to have the meanings set forth below. The catalytic hydrocracking process is a process for converting a hydrocarbon feed by contacting the feed with a catalyst in the presence of hydrogen in a hydrocracking zone at pressures of at least 500 p.s.i.g., preferably from 800–3000 p.s.i.g. The contacting temperature is about from 400°–900° F., preferably 500°–800° F. The operating temperature during the on-stream period preferably is maintained at as low a value as possible consistent with maintaining adequate per-pass conversion as catalyst fouling progresses. While those skilled in the art will realize that the desired initial and terminal temperatures will be influenced by various factors including character of feed and catalyst, generally it will be desirable to operate the process with an initial on-stream temperature of about from 500°–650° F. with progressive increase to about 750°–800° F. to maintain substantially constant conversion of at least 25 volume percent, preferably 35–90 volume percent per-pass of the hydrocarbon feed to products boiling below the initial boiling point of that feed. Higher conversions are possible with more acidic catalysts; however, such catalysts give a different product distribution than less acidic catalyst as discussed below.

(b) Hydrocracking catalysts, general: The catalytic hydrocracking catalyst may comprise a hydrogenating-dehydrogenating component which is either:

(1) deposited on or otherwise intimately associated with a strongly acidic cracking component, such as silica-alumina, or
(2) unsupported, or
(3) deposited or otherwise intimately associated with a cracking component that is only weakly acidic, compared with silica-alumina.

When the catalyst comprises a weakly acidic cracking component it tends to produce greater amounts of products boiling in the middle distillate boiling range than does a strongly acidic unsupported catalyst or a supported catalyst comprising a strongly acidic cracking component.

(c) Strongly acidic hydrocracking catalyst: The conventionally used strongly acidic hydrocracking catalysts generally comprise both a hydrogenating-dehydrogenating component and a cracking component. The cracking component may be in the form of a support or carrier impregnated with the hydrogenating component or components, or the cracking component may be intimately mixed with the hydrogenating component or components during catalyst manufacture. Strongly acidic hydrocracking catalysts occasionally may not contain a cracking component as such; for example, tungsten sulfide alone is known to have both strongly acidic cracking activity and hydrogenating activity.

The strongly acidic hydrocracking catalyst containing a cracking component may comprise any one or more of such acidic materials as silica-alumina, silica-alumina-zirconia composites, alumina-boria, fluorided composites and the like as well as various acid treated clays and similar materials. The preferred hydrocracking catalyst for purposes of the present invention comprises a silica-alumina cracking component having a silica content in the range of from about 30–99 wt. percent. The hydrogenating-dehydrogenating component or components of the catalyst can be selected from any one or more of the various Groups VI and VIII metals as well as the oxides, sulfides and selenides thereof, alone or together with promoters or stabilizers that may have by themselves some catalytic activity. Representative hydrogenating-dehydrogenating components are the oxides, sulfides and selenides of nickel, cobalt, platinum, palladium, molybdenum and tungsten. A particularly preferred catalyst for purposes of the present invention comprises nickel sulfide intimately associated with a silica-alumina cracking component.

(d) Weakly acidic hydrocracking catalyst: When a weakly acidic hydrocracking catalyst is used it may comprise a cracking component selected from such materials as silica, charcoal, kieselguhr, titania, zirconia, bauxite, alumina and silica-magnesia with alumina and silica-magnesia being especially preferred for purposes of the present invention. The hydrogenating-dehydrogenating component can be selected from any one or more of the Groups VI and VIII metals as well as the oxides, sulfides and selenides thereof, representative materials being the oxides, sulfides and selenides of nickel, cobalt, platinum, palladium, molybdenum and tungsten. The most preferred weakly acidic catalyst for purposes of the present invention comprises either nickel and tungsten compounds associated with silica-magnesia or nickel and molybdenum compounds associated with alumina.

(e) Feed stocks: The hydrocarbon feed stocks which may be converted in a conventional hydrocracking process as described above may be any hydrocarbon distillates boiling from about 95° F. to 1100° F. and may be any hydrocarbon residua boiling above about 500° F. However, in the combination process of the present invention it will be preferred to supply to the hydrocracking zone only hydrocarbon distillates boiling from about 95° F. to 850° F., preferably 200° F. to about 650° F. Because hydrocracking catalysts are generally nitrogen-sensitive and because nitrogen compounds tend to concentrate in the higher boiling fractions of hydrocarbon distillates and residua, if the end product of the feed is not more than about 650° F., in most cases the feed will be sufficiently low in nitrogen to permit the most desirable operation of the hydrocracking process without first hydrofining the feed to reduce the nitrogen content thereof. The hydrocracking feed stocks supplied to the hydrocracking zone in the process of the present invention may contain sulfur in amounts ranging from 5–3000 p.p.m. Most hydrocarbon feed stocks will contain amounts of sulfur in this range, and it is one of the advantages of the process of the present invention that the hydrocracking catalyst will not only hydrocrack the hydrocarbon feed stock but will substantially desulfurize it.

(B) Advantages of catalytic hydrocracking as feed preparation process for gasification processes (a) Desulfurization activity of hydrocracking catalyst: The aforesaid desulfurization activity of hydrocracking catalysts enables the sulfur content of the feed to a hydrocracker to be reduced from relatively high levels in the range 5–3000 p.p.m. to low levels below 5 p.p.m., while concurrently hydrocracking the feed, under the aforesaid hydrocracking reaction conditions. The combination of hydrocracking and desulfurization activity is important in the process of the present invention because it enables a hydrocarbon feed unsuitable as a steam reforming feed because of excessive sulfur content or excessive end point, or both, to be converted in substantial part by hydrocracking to a steam reforming feed stock having an adequately low sulfur content and end point.

(b) Cracking and light hydrocarbon gas production: The catalytic hydrocracking reaction described above is particularly important in the process of the present invention because it is capable of converting a hydrocarbon feed stock into substantial quantities of lower boiling materials with an extremely low concurrent production of light hydrocrabon gases, particularly methane and ethane. Because the production of such light gases uses hydrogen, hydrogen requirements for the hydrocracking zone are less than if there were a high production of such light gases in that zone. Further, the hydrogen partial pressure in the hydrocracking zone can be kept lower and accordingly, hydrocracking reactor costs can be kept lower than if more light gases were produced there.

OBJECTS

It is an object of the present invention to provide an improvement in processes wherein manufactured gases are produced in gasification units, including thermal cracking and steam reforming units. A more particular object of the present invention is to provide a combination process in which hydrocracking is combined with prior art gasification processes in such a way that increased flexibility in selecting feeds for said prior processes is obtained, and such a way that the need for desulfurization facilities for said prior processes is obviated. It is another object of the present invention to provide such a combination process having great flexibility in producing various products, including fuel gases, substantially pure hydrogen, and synthesis gases, and further great flexibility in producing fuel gases in widely varying ranges of fuel values, calorific values, Wobbe numbers and flame speeds. Other objects and advantages of the present invention will be apparent from the following description when read in connection with the accompanying drawings.

STATEMENT OF INVENTION

In its broad aspects the present invention combines one or more hydrocracking steps with at least one subsequent gasification step, to produce valuable gases. More particularly, in accordance with the present invention there is provided a process for producing a valuable gas from a hydrocarbon distillate which comprises catalytically hydrocracking said distillate in at least one hydrocracking zone, and gasifying in a pasification zone at least a portion of the effluent from said hydrocracking zone.

In accordance with a further embodiment of the present invention there is provided a process for producing valuable gases from a hydrocarbon distillate, which comprises hydrocracking said distillate in a hydrocracking zone, separating the effluent from said hydrocracking zone into fractions, including at least a first fraction and a second fraction containing substantial quantities of hydrocarbons having a higher molecular weight than the hydrocarbons in said first fraction, gasifying at least a substantial portion of said first fraction in a gasification zone to a methane-rich gas, and steam reforming said second fraction in a steam reforming zone under severe reforming conditions to produce a hydrogen-rich gas.

In accordance with a further embodiment of the present invention there is provided a process for producing valuable gases from a hydrocarbon distillate, which comprises hydrocracking said distillate in a hydrocracking zone, separating the effluent from said hydrocracking zone into fractions including at least a first fraction and a second fraction containing substantial quantities of hydrocarbons having a higher molecular weight than the hydrocarbons in said first fraction, steam reforming said first fraction in a first steam reforming zone under mild reforming conditions to produce a methane-rich gas, and steam reforming said second fraction in a second steam reforming zone under severe conditions to produce a hydrogen-rich gas.

In accordance with a further embodiment of the present invention there is provided a process for producing valuable gases from a hydrocarbon distillate, which comprises catalytically hydrocracking said distillate in a hydrocracking zone, separating the effluent from said hydrocracking zone into fractions, including at least a first fraction and a second fraction containing substantial quantities of hydrocarbons having a higher molecular weight than the hydrocarbons in said first fraction, gasifying at least a substantial portion of said first fraction in a gasification zone to a methane-rich gas, steam reforming said second fraction in a steam reforming zone under severe conditions to produce a hydrogen-rich gas, and purifying and passing to said hydrocracking zone at least a portion of said hydrogen-rich gas, said purifying comprising the steps of shift conversion, $CO_2$ removal and final purification, said final purification being accomplished by a step selected from methanation for residual CO and $CO_2$ conversion, and liquid wash for residual CO and $CO_2$ removal.

DETAILED DESCRIPTION

Figure 1:
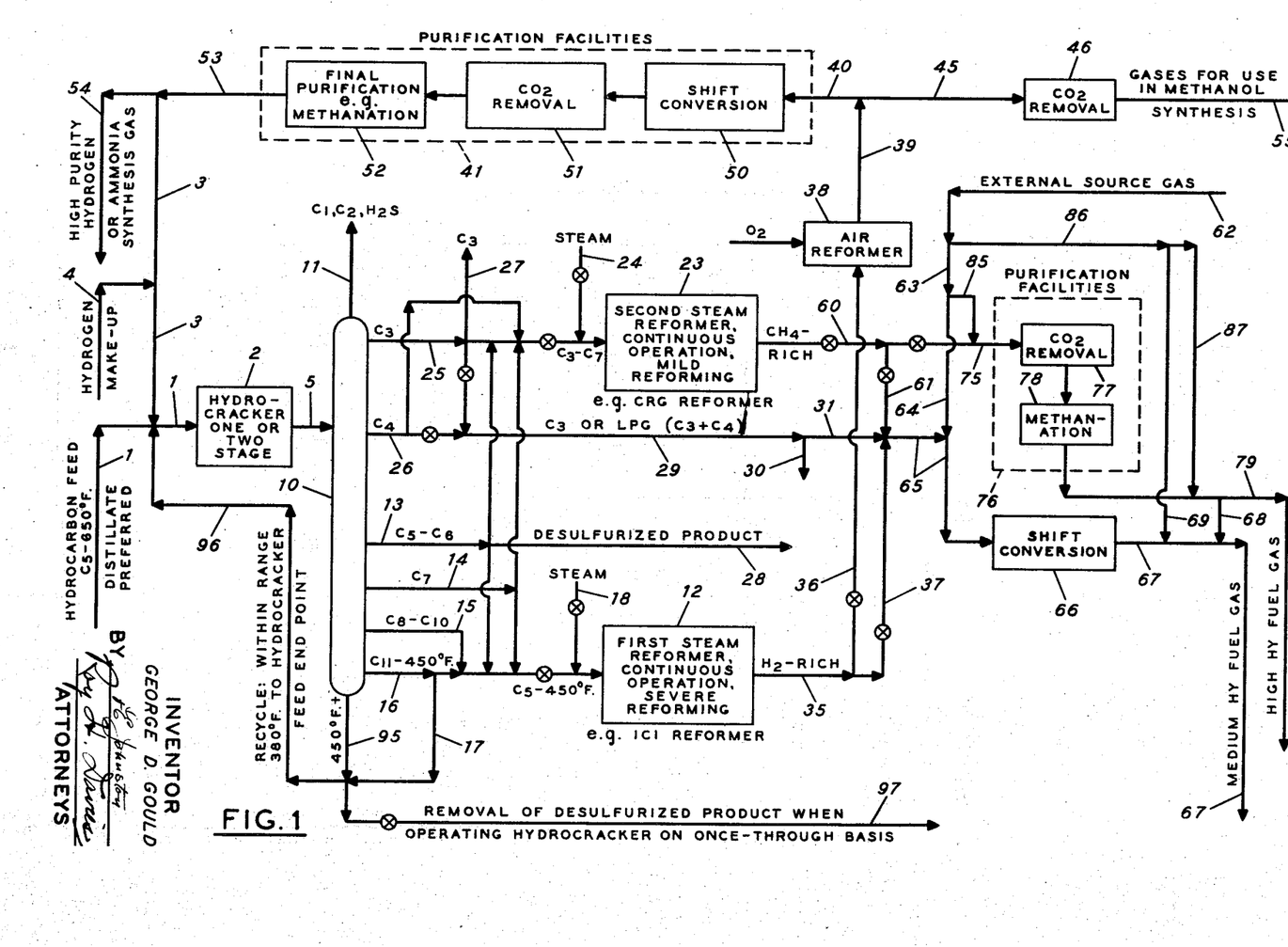
FIG. 1 is a diagrammatic illustration of appaatus and flow paths suitable for use in practising an embodiment of the present invention in which one or more hydrocracking stages is used in combination with a first steam reforming stage operating under severe reforming conditions, and a second reforming stage operating under mild reforming conditions.

(A) FIG. 1

Referring now to FIG. 1 there shown is an embodiment of the present invention employing one or more hydrocracking stages in combination with two steam reformers, one of which is operated under severe reforming conditions and one of which is operated under mild reforming conditions. In the embodiment shown great flexibility is obtained in the production of various products in varying amounts and compositions. The products include synthesis gases, high purity hydrogen, and fuel gases having various calorfic values and other characteristics.

Still referring to FIG. 1 a hydrocarbon feed, preferably a hydrocarbon distillate boiling within the range 50° F. to 650° F. is passed through line 1 into hydrocracking zone 2, which may comprise one hydrocracking stage, or more than one hydrocracking stage. Those skilled in the art will recognize that if more than one hydrocracking stage is used valuable hydrocracked products may be withdrawn from each of the stages for any desired use. Each stage is hydrocracking zone 2 is operated with the hydrocracking catalysts and under the hydrocracking conditions previously discussed. Hydrocracking zone 2 is supplied with recycle hydrogen as necessary through line 3 and with hydrogen make-up as necessary through line 4. The effluent from hydrocracking zone 2, when that zone comprises one stage, or from the final stage, when that zone comprises more than one stage, comprises materials having an average molecular weight substantially below the average molecular weight of the feed, and comprises $H_2S$ containing substantially all the sulfur originally present in the feed to the final stage in zone 2. This effluent is passed from zone 2 through line 5 to separation zone 10. From separation zone 10 $C_1$ and $C_2$ hydrocarbon gases and $H_2S$ are removed through line 11.

Figure 2:
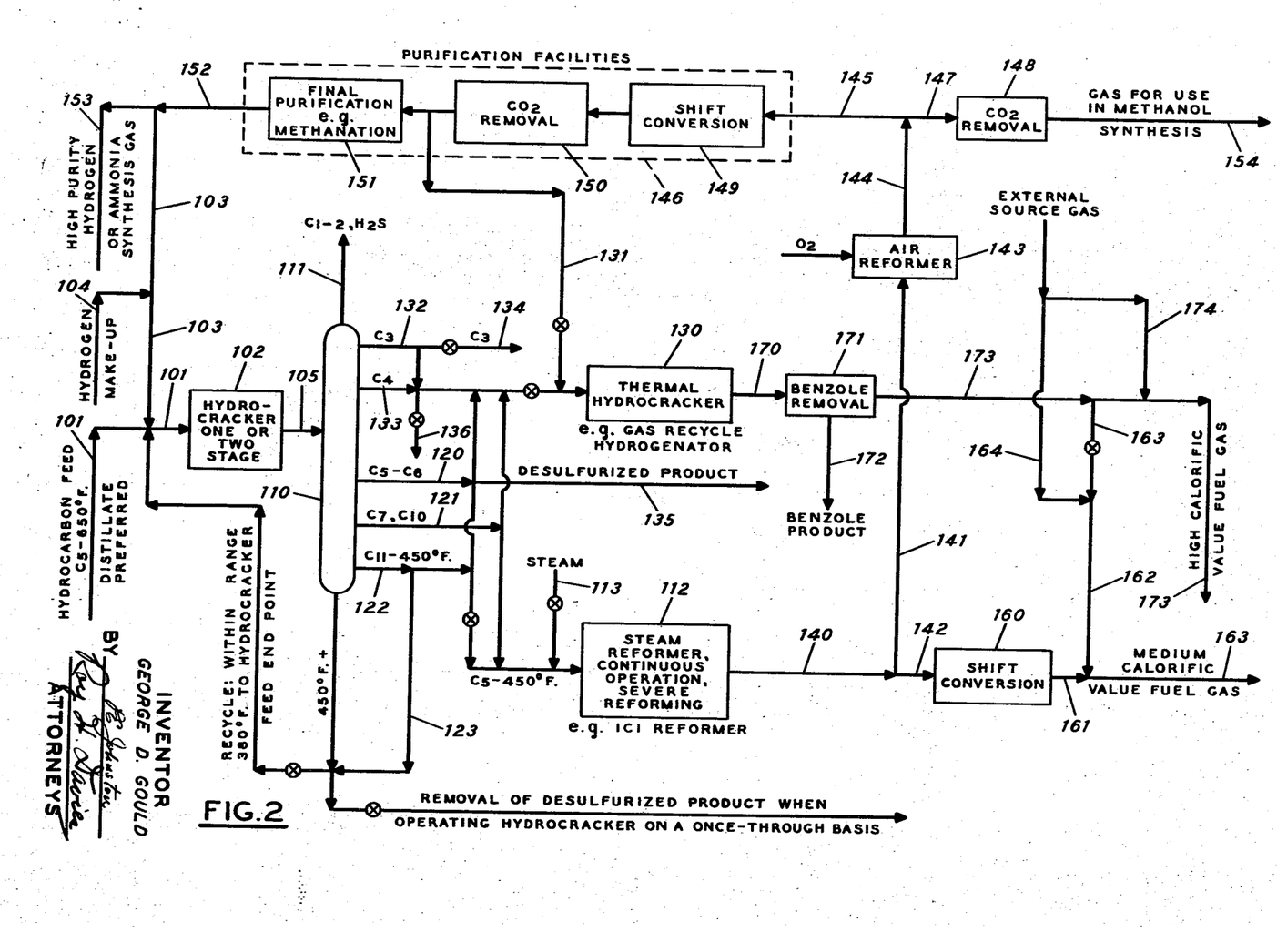
FIG. 2 is a diagrammatic illustration of apparatus and flow paths suitable for use in practising an embodiment of the present invention in which one or more hydrocracking stages is used in combination with a steam reforming stage operating under severe reforming conditions, and a thermal hydrocracking stage, particularly a Gas Recycle Hydrogenator.

To facilitate further understanding of the present dismussion of FIG. 1, as well as of the subsequent discussion of FIG. 2, the boiling points of the normal paraffinic hydrocarbons, from $C_5$ through $C_{12}$, which are higher than for the corresponding isomers, are set forth here for convenience.

| Compound | °F. | °C. |
|---|---|---|
| C₅H₁₂ | 97 | 36.2 |
| C₆H₁₄ | 156.2 | 69.0 |
| C₇H₁₆ | 209 | 98.4 |
| C₈H₁₈ | 250 | 125.8 |
| C₉H₂₀ | 303 | 150.8 |
| C₁₀H₂₂ | 348 | 174 |
| C₁₁H₂₄ | 383 | 195.8 |
| C₁₂H₂₆ | 420 | 214.5 |

Terms such as "$C_3$," "$C_4$" and "$C_5$" etc. as used herein and throughout this specification are intended to include both normal and isomeric hydrocarbon compounds having the indicated carbon content.

From zone 10 a stream boiling within the range $C_5$–450° F. is passed as shown to first steam reformer 12, and is reacted therein under severe steam reforming conditions with steam supplied through line 18. This first steam reformer conveniently may be an ICI process reformer. The end point of this stream should not be oved 450° F., and preferably should be less, as discussed above in connection with steam reforming processes. This stream has the low sulfur content necessary for steam reformer feeds, because it is a hydrocracked product from which sulfur was removed by the hydrocracking reaction.

The total stream from zone 10 to first steam reformer 12 may comprise all or a portion of any of the streams in lines 13, 14, 15 and 16 as shown. Any portion of the $C_{11}$–450° F. materials in line 16 that are not passed to zone 12 may be passed through line 17.

From zone 10 a stream boiling within the range $C_3$–$C_7$ is passed as shown to second steam reformer 23, and is reacted therein under mild steam reforming conditions with steam supplied through line 24. This second steam reformer conveniently may be a CRG process reformer.

The total stream that is passed from zone 10 to second steam reformer 23 may include all or a portion of the materials withdrawn from zone 10 through any or all of lines 25, 26, 13 and 14, as shown.

A $C_3$ product may be withdrawn through line 27, if desired. A $C_5$, $C_6$ product, which is a desulfurized product because of the prior hydrocracking reaction, may be withdrawn through line 28 if desired. A $C_3$ stream or an LPG (liquified petroleum gas comprising $C_3$ and $C_4$) stream may be passed through line 29 and withdrawn as a product through line 30 or passed from line 29 to line 31 as a fuel gas enrichment material, as discussed below.

Figure 3:
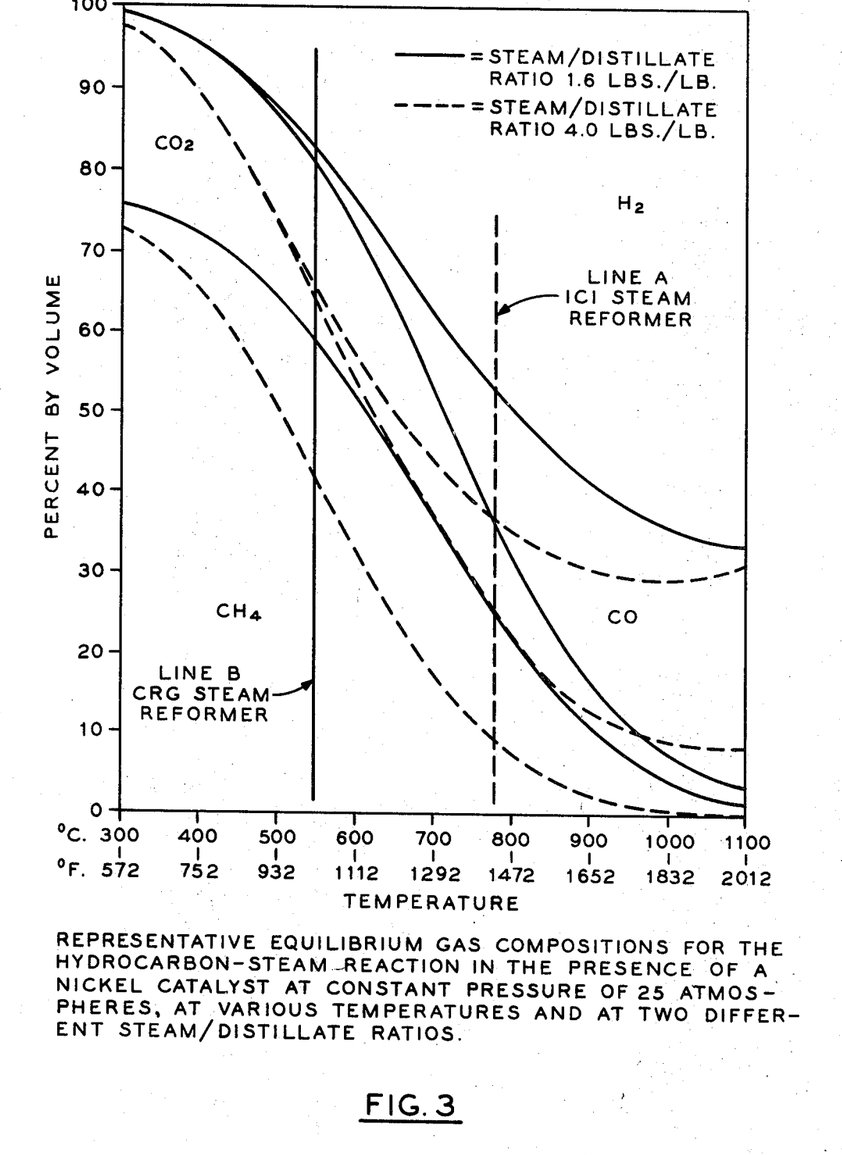
FIG. 3 is a graph showing representative equilibrium gas compositions for the hydrocarbon-steam reaction in the presence of a nickel catalyst at constant pressure, at various temperatures and at two different steam/distillate ratios.

From the first steam reformer 12 a hydrogen-rich stream, which may comprise 61–63 volume percent $H_2$, 14–16 volume percent $CO_2$, 11–16 volume percent CO, and 9–12 volume percent $CH_4$, as discussed heretofore in connection with severe steam reforming, and as discussed below in connection with FIG. 3, is passed through line 35 from where it is passed into line 36 or line 37. Alternatively, a portion thereof may be passed into line 36 and a portion thereof may be passed into line 37. Gases passing through line 36 may be passed into air reformer 38 and treated therein to reduce the methane content thereof down to below 1 volume percent. The effluent gases from air reformer 38 are passed through line 39 and thence through line 40 to purification facilities 41 or through line 45 to $CO_2$ removal zone 46. Alternatively, a portion of the gases in line 39 may be passed through line 40 and a portion may be passed through line 45. Purification facilities 41 in which gases from line 40 are purified preferably comprise a shift conversion zone 50, a $CO_2$ removal zone 51 and a final purification zone 52, which may comprise any conventional process, for example methanation, for removing or converting trace amounts of CO and $CO_2$. An adequate discussion of the zones which may be included in purification facilities 41, and the operation thereof, has been provided previously herein. From purification facilities 41 a high purity hydrogen stream, which may have a hydrogen concentration of above 97 volume percent, is passed through line 53 from which a portion thereof may be passed through lines 3 to 1 to hydrocracking zone 2. A portion of the high purity hydrogen stream in line 53 may be withdrawn through line 54 as a product or for use in ammonia synthesis.

Gases low in methan content and $CO_2$ content, but having an appreciable content of $H_2$ and CO may be recovered from $CO_2$ removal zone 46 for use in methanol synthesis.

The gas in line 37 serves as a hydrogen-rich, methane lean gas which may be enriched with a methane-rich gas in any desired proportions to produce a medium heating value fuel gas having a heating value, for example, of around 500 B.t.u. per cubic foot. Accordingly, this lean gas in line 37 may be enriched by combining it with a methane-rich gas from second steam reformer 23 passing through lines 60 and 61. The gas in line 37 also may be enriched by $C_3$ hydrocarbons or LPG passing through line 31. The gas in line 37 also may be enriched by gases from an external source passing through lines 62, 63 and 64 which may be LPG, natural gas, refinery gas, or tail gas. The gas in line 37 may be enriched with one or more of these enrichment gases in any proportions, and the resulting gas mixture may be passed through line 65 to shift conversion zone 66 where the CO content thereof is reduced. A medium heating value fuel gas is withdrawn from shift conversion zone 66 through line 67. Enrichment gas for the gas in line 37 may be passed through line 68 instead of through line 61 and may be passed through line 69 instead of through line 64, depending upon the degree of purification of the enrichment gas that is desired.

From second steam reformer 23, a methane-rich gas is passed through line 60 and line 75 to purification facilities 76, which preferably comprise a $CO_2$ removal zone 77 and a methanation zone 78; this gas is purified in these purification facilities and the purified gas having a high heating value, for example 1000 B.t.u. per cubic foot, is recovered through line 79 as a high heating value fuel gas. The gas in line 75 may be augmented if desired with gases from an external source passed through lines 62, 63 and 85. Alternatively, the gas from an external source may be passed through lines 62, 86 and 87 to augment the gas in line 79.

From separation zone 10 materials boiling within the range of about 380° F. to the end point of the feed to hydrocracking zone 2 may be recycled through line 96. These materials may comprise 450° F. + materials from line 95 and $C_{11}$–450° F. materials from line 24. Alternatively, if it is desired to operate hydrocracking zone 2 on a once-through basis, materials passing through lines 24 and 95 may be removed through line 97 as a product which is essentially sulfur-free because of the desulfurizing action to which these materials were subjected in hydrocracking zone 2.

Fuel gas may be produced pursuant to the FIG. 1 embodiment of the present invention not only with different desired calorific values but also with many different desired combinations of Wobbe number and flame speed, as will be further appreciated from the discussion of FIG. 4 below.

(B) FIG. 2

Referring now to FIG. 2 there shown is an embodiment of the present invention employing one or more hydrocracking stages in combination with a steam reforming stage operated under severe reforming conditions, and a thermal hydrocracking stage, particularly a Gas Recycle Hydrogenator. In the embodiment shown great flexibility is obtained in the production of various products in varying amounts and compositions. The products include synthesis gases, high purity hydrogen and fuel gases having various calorific values and other characteristics.

Still referring to FIG. 2 a hydrocarbon feed, preferably a hydrocarbon distillate boiling within the range $C_5$–650° F. is passed through line 101 into hydrocracking zone 102 which may comprise one hydrocracking stage or more than one hydrocracking stage. Those skilled in the art will recognize that if more than one hydrocracking stage is used valuable hydrocracked products may be withdrawn from each of the stages for any desired use. Each stage in hydrocracking zone 102 is operated with the hydrocracking catalysts and under the hydrocracking conditions previously discussed. Hydrocracking zone 102 is supplied with recycle hydrogen as necessary through line 103 and with hydrogen make-up as necessary through line 104. The effluent from hydrocracking zone 102 when that zone comprises one stage or from the final stage when that zone comprises more than one stage, comprises materials having an average molecular weight substantially below the average molecular weight of the feed and complises $H_2S$ containing substantially all the sulfur originally present in the feed to the final stage in zone 102. This effluent is passed from zone 102 through line 105 to separation zone 110. From separation zone 110 $C_1$ and $C_2$ hydrogen gases and $H_2S$ are removed through line 111.

To facilitate further understanding of the present discussion of FIG. 2 reference is made to the table of boiling points of $C_5$ through $C_{12}$ normal paraffinic hydrocarbons which is set forth above in connection with the discussion of FIG. 1.

From zone 110 a stream boiling within the range $C_5$–450° F. is passed as shown to steam reformer 112 operating under severe conditions and supplied with steam through line 113. This steam reformer conveniently may be an ICI process reformer. The end point of this stream should not be over 450° F. and preferably should be less as discussed above in connection with steam reforming processes. This stream has the low sulfur content necessary for steam reformer feeds because it is a hydrocracked product from which sulfur was removed by the hydrocracking reaction.

The total stream from zone 110 to steam reformer 112 may comprise all or a portion of any of the streams in ines 120, 121, and 122 as shown. Any portion of the $C_{11}$–450° F. materials in line 122 that are not passed to zone 112 may be passed through line 123.

From zone 110 a stream boiling within the range $C_3$–450° F. is passed as shown to thermal hydrocracker 130, which conveniently may be a Gas Recycle Hydrogenator, and is reacted therein under thermal hydrocracking conditions with a hydrogen-rich gas, which may conveniently be purified hydrogen-rich gas recycled from steam reformer 112 through line 31.

The total stream that is passed from zone 110 to thermal hydrocracker 130 may include all or a portion of the materials withdrawn from zone 110 through any or all of lines 132, 133, 120, 121 and 122 as shown.

The $C_3$ product may be withdrawn through line 134 if desired. A $C_5$, $C_6$ product which is a desulfurized product because of the prior hydrocracking reaction, may be withdrawn through line 135 if desired. An LPG stream may be withdrawn as a product through line 136 if desired. Any portion of the stream in line 134 or of the stream in line 136 may be used as a fuel gas enrichment material for the hydrogen-rich, methane lean gas produced by steam reformer 112, if desired.

From steam reformer 112 a hydrogen-rich stream which may comprise 61–63 volume percent $H_2$, 14–16 volume percent $CO_2$, 11–16 volume percent CO and 9–12 volume percent $CH_4$, as discussed heretofore in connection with severe steam reforming, and as discussed below in connection with FIG. 3 is passed through line 140 from where it is passed into line 141 or 142. Alternatively a portion thereof may be passed into line 141 and a portion thereof may be passed into line 142. Gases passing through line 141 may be passed into air reformer 143 and treated therein to reduce the methane content thereof down to below 1 volume percent. The effluent gases from air reformer 143 are passed through line 144 and thence through line 145 to purification facilities 146 or through line 147 to $CO_2$ removal zone 148. Alternatively a portion of the gases in line 144 may be passed through line 145 and a portion may be passed through line 147. Purification facilities 146 in which gases from line 145 are purified preferably comprise a shift conversion zone 149, a $CO_2$ removal zone 150 and a final purification zone 151, which may comprise any conventional processes, for example methanation, for removing or converting trace amounts of CO and $CO_2$. An adequate discussion of the zones which may be included in purification facilities 146 and the operation thereof has been provided previously herein. From purification facilities 146 a high purity hydrogen stream which may have a hydrogen concentration of above 97 volume percent is passed through line 152 from which a portion thereof may be passed through lines 103 and 101 to hydrocracking zone 102. A portion of the high purity hydrogen stream in line 152 may be withdrawn through line 153 as a product or for use in ammonia synthesis.

Gases low in methane content and $CO_2$ content but having an appreciable content of $H_2$ and CO may be recovered from $CO_2$ removal zone 154 for use in methanol synthesis.

The gas in line 142 serves as a hydrogen-rich, methane lean gas which may be enriched with a methane-rich gas in any desired proportions to produce a medium heating value fuel gas having a heating value for example of around 500 B.t.u. per cubic foot. This lean gas in 142 may be so enriched either before or after it is passed into shift conversion zone 160. The enrichment may be by any one or combination of LPG from line 136, a methane-rich gas from thermal hydrocracker 130 or gas from an external source, which may be LPG, natural gas, refinery gas, or tail gas. The enrichment may be in any desired proportions of the methane lean gas and of the enrichment gas. As shown in the figure the methane lean gas in line 142 is passed into shift conversion zone 160 wherein the CO content of the gas is reduced. From shift conversion zone 160 the methane lean gas is passed through line 161 and combined with an enriching gas passing through line 162 to produce a medium calorific value fuel gas which is withdrawn through line 163. The enriching gas in line 162 preferably comprises gas entering line 162 from thermal hydrocracker 130 via line 163, but alternatively or in addition, the enrichment gas may be a gas from an external source entering line 162 through line 164.

From thermal hydrocracker 130 a methane and ethane-rich gas with a substantial hydrogen content is passed through line 170 to benzole removal zone 171 where benzole is removed therefrom and withdrawn through line 172 as a product. The resulting gas, having a heating value above 1000 B.t.u. per cubic foot, is recovered from benzole removal zone 171 through line 173 as a high calorific value fuel gas product. This gas product may be augmented if desired by gas from an external source passing through line 174.

Fuel gases may be produced pursuant to the FIG. 2 embodiment of the present invention not only with different desired calorific values, but also with many different desired combinations of Wobbe number and flame speed, as will be further appreciated from the discussion of FIG. 4 below.

(C) FIG. 3

Referring now to FIG. 3 there shown is a graph of representative equilibrium gas compositions for the hydrocarbon steam reaction in the presence of a nickel catalyst at a constant pressure of 370 p.s.i.g., at various temperatures and at two different steam/distillate ratios. As heretofore discussed in connection with steam reforming under mild conditions, and under severe conditions, respectively, severe steam reforming conditions include a temperature higher than the temperature used for steam reforming under mild conditions. As an example, an ICI steam reformer operating at severe conditions including an exit temperature of about 1400° F. and a steam/distillate ratio of 4.0 lbs. of steam per pound of distillate and at a pressure of 370 p.s.i.g., will produce a product gas having a composition which may be determined from an inspection of FIG. 3 along line A. As a further example a CRG steam reformer operating at mild conditions including an exit temperature of about 1000° F. and at a steam/distillate ratio of 1.6 lbs. of steam per pound of distillate and at a pressure of 370 p.s.i.g. will produce a product gas having a composition which may be determined from an inspection of FIG. 3 along line B.

From the foregoing discussion of FIG. 3 and from the previous discussion of steam reforming it may be seen that in the hydrocarbon-steam reaction conditions favoring $CH_4$ production include (a) lower temperature; and
(b) lower steam/hydrocarbon ratio.

$CH_4$ production also is favored by higher pressures, which, however, usually are below 500 p.s.i.g. It will also be seen that the conditions that favor $CH_4$ production also tend to favor $CO_2$ production while severely limiting CO and $H_2$ production.

Conversely it may be seen that conditions favoring hydrogen production include (a) higher temperature; and
(b) higher steam/hydrocarbon ratio.

Hydrogen production is also favored by a lower pressure which, however, in any case, usually is in the range below 400 p.s.i.g. It may be seen that conditions favoring hydrogen production tend to favor CO production while severely limiting production of $CO_2$ and $CH_4$.

Figure 4:
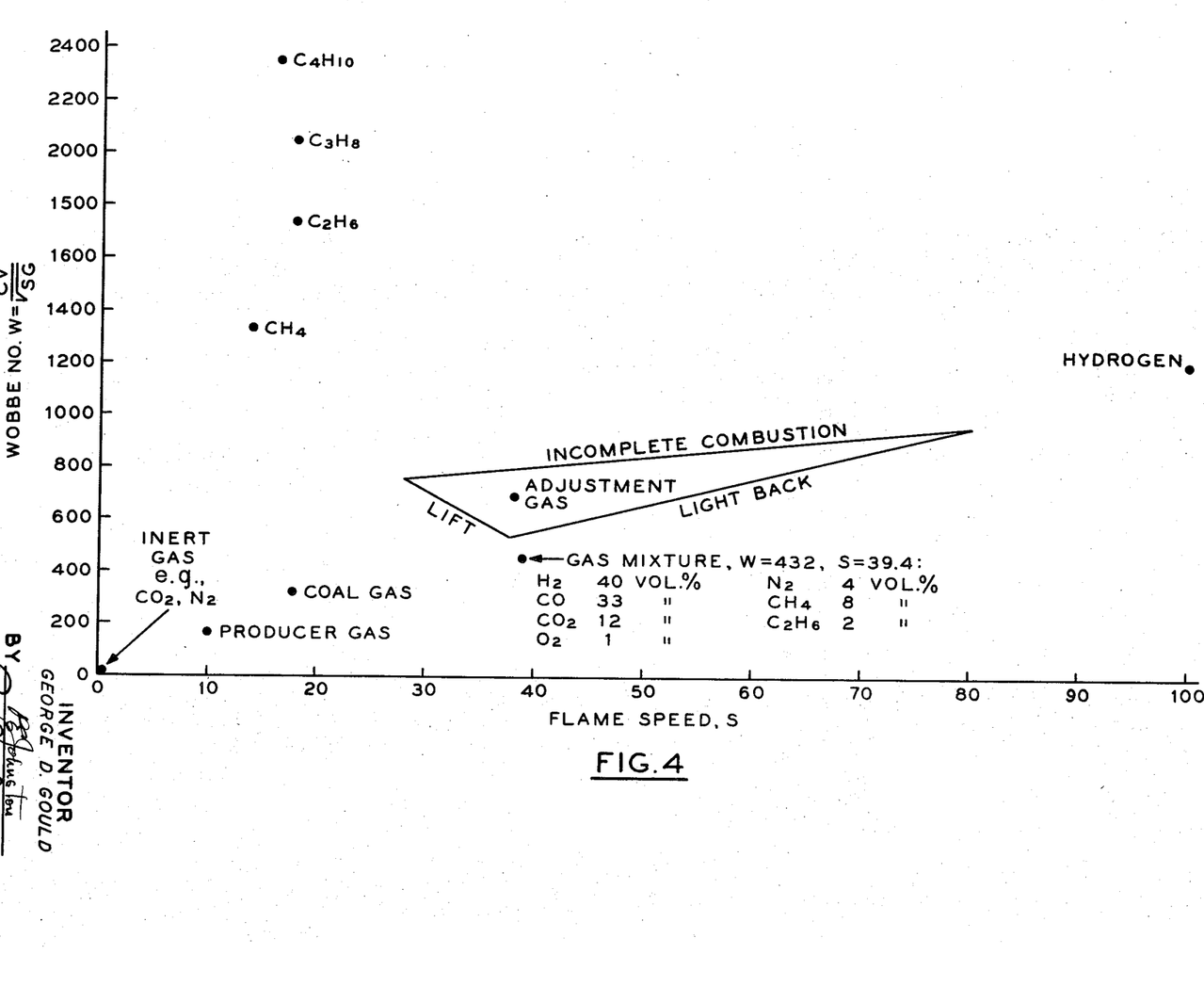
FIG. 4 is a graph in which Wobbe number W is plotted against flame speed S and on which is indicated the locations of various hydrocarbon gases, hydrogen, inert gases, and gas mixtures.

(D) FIG. 4

Referring now to FIG. 4 there shown is a graph in which Wobbe number W is plotted against flame speed S and on which is indicated the locations of various hydrocarbon gases, hydrogen, inert gases and gas mixtures.

Approximate estimates of the Wobbe number and flame speed of mixtures of gases may be made from FIG. 4 by inspection. A mixture of two individual gases is approximately represented by a point on the straight line joining the two individual gases, a point being located on the line approximately according to the proportions of the two gases present in the mixture.

From the graph it will be noted that when a burner is adjusted for proper operation with a particular adjustment gas X, a triangular envelope around the location of the adjustment gas X on the graph indicates the limits within which other gas mixtures must fall if they are to give satisfactory operation with that particular burner. The three boundaries of the envelope, incomplete combustion, lift, and light back, have been discussed previously in connection with fuel gas characteristics.

From the graph it will be noted that in countries wherein there is widespread operation of gas appliances with manufactured gas having a heating value of around 500 B.t.u./ft.³ it is not sufficient merely to produce a 500 B.t.u. per cubic foot gas blend substantially comprising hydrogen and hydrocarbon gas, because such a blend would have too high a Wobbe number for use in most existing burners. Such a blend would have to be further modified by adding various proportions of various diluents or ballast gases having lower Wobbe numbers, for example $CO_2$ and nitrogen, in order to produce a mixture for a given burner lying within the appropriate envelope on the Wobbe number-flame speed graph surrounding the adjustment gas with which the particular burner was adjusted.

It can also be appreciated from the diagram that in countries such as the United States wherein most burners are designed and adjusted for use with a high methane content gas of relatively invariable composition throughout the country the Wobbe number-flame speed relationship of any natural gas that may be used in such burners is not nearly as critical as in countries where the use of manufactured gas is predominant.

From the graph also may better be appreciated the utility, in the process combinations of the various embodiments of the process of the present invention, of the following:

(a) a hydrocracking stage producing desulfurized feeds for steam reformers and thermal hydrocrackers, and also producing $C_3$ hydrocarbons and LPG ($C_3+C_4$ hydrocarbons);
(b) a steam reformer operating under severe reforming conditions producing large quantities of hydrogen;
(c) a steam reformer operating under mild reforming conditions producing large quantities of methane;
(d) a thermal hydrocracker producing large quantities of a gas comprising substantial quantities of hydrogen, methane and ethane.

From the graph also when considered in connection with FIG. 3 will better be appreciated the utility in a final fuel gas of various quantities of $CO_2$ produced during steam reforming under severe reforming conditions, and under mild reforming conditions, respectively.

EXAMPLES

Example I 3785 b.p.s.d. (barrels per stream day) of a straight run naphtha from a Middle East crude oil, having a gravity of 67.5° API, comprising $C_5$ to $C_{10}$ hydrocarbons, and containing 500 p.p.m. sulfur, is hydrocracked on a $C_6+$ recycle basis; that is, those hydrocarbons in the effluent from the hydrocracker containing more than 5 carbon atoms are recycled to the hydrocracker. The hydrocracker is operated with a sulfided catalyst comprising a silica-alumina cracking component and 6 wt. percent nickel, at 1100 p.s.i.g., 5000 s.c.f. of hydrogen per barrel of fresh feed, and at a starting temperature of 600° F. The temperature is gradually raised within the range 600° to 800° F. as necessary to maintain a constant conversion of about 60% of the hydrocracker feed to $C_5$ and lighter materials.

The hydrocracker yields of $C_5$ and lighter materials are as follows:

|  | Wt. Percent of Hydrocracker/ Hydrocarbon Feed | Pounds per Day |
|---|---|---|
| $H_2$ |  | 3,720 |
| $H_2S$ | 0.05 | 470 |
| $C_1$ | 0.45 | 32,451 |
| $C_2$ | 0.71 | 6,681 |
| $C_3$ | 22.56 | 212,279 |
| $nC_4+iC_4$ | 39.40 | 370,735 |
| $C_5$ | 39.59 | 369,700 |
| Total | 102.46 |  |

The $H_2S$ is removed from the hydrocracker effluent, a $C_5$ portion of the effluent is steam reformed in an ICI steam reformer, and the remainder of the effluent is steam reformed in a CRG steam reformer. The portions of the hydrocracker effluent so processed are as follows:

|  | To CRG Reformer, Pounds per day | To ICI Reformer, Pounds per day |
|---|---|---|
| $H_2$ | 3,720 |  |
| $C_1$ | 32,541 |  |
| $C_2$ | 6,681 |  |
| $C_3$ | 212,279 |  |
| $C_4$ | 370,735 |  |
| $C_5$ | 52,710 | 316,990 |

The CRG reformer produces from the aforesaid feed 350,000 m.³ per day of a gaseous product having a specific gravity of 0.663, a heating value of 6,730 Kcal. per m.³, and a composition as follows:

| | Vol. percent |
|---|---|
| $CO_2$ | 18.5 |
| $CO$ | 0.6 |
| $H_2$ | 15.1 |
| $CH_4$ | 65.8 |

The ICI reformer produces from the aforesaid feed 666,100 m.³ per day of a gaseous product having a composition, after a shift conversion step to convert CO to $CO_2$, as follows:

| | Vol. percent |
|---|---|
| $CO_2$ | 21.8 |
| $CO$ | 3.7 |
| $H_2$ | 66.7 |
| $CH_4$ | 7.8 |

450,000 m.³/day of the aforesaid ICI reformer product is blended with the 550,000 m.³/day CRG reformer product to produce 1,000,000 m.³/day of a finished town gas having a heating value of 5000 kilocalories/m.³ (about 550 B.t.u./ft.³), and a flame speed of around 29.

The remainder of the ICI reformer product, 216,100 m.³/day, is purified sequentially in a shift conversion zone, a $CO_2$ removal zone, and a methanation zone, to produce a hydrogen rich gas consisting essentially of hydrogen and methane, having a hydrogen content of about 88 vol. percent. This hydrogen-rich gas is passed to the hydrocracker to contribute to the hydrogen requirements thereof.

Example II 3815 b.p.s.d. of the straight run naphtha feed of Example I is hydrocracked on a once-through basis, that is with no recycle to the hydrocracking zone of unconverted products therefrom. The hydrocracker is operated with the same catalyst and under the same conditions as in Example I.

The hydrocracker yields are as follows:

| | Wt. percent of Hydrocracker/ Hydrocarbon Feed | Pounds per Day |
|---|---|---|
| $H_2$ | | 2,027 |
| $H_2S$ | 0.05 | 474 |
| $C_1$ | 0.03 | 22,725 |
| $C_2$ | 0.18 | 1,707 |
| $C_3$ | 6.90 | 65,440 |
| $nC_4+iC_4$ | 18.18 | 172,421 |
| $C_5$ | 26.04 | 246,966 |
| $C_6$ | 20.45 | 193,950 |
| $C_7+$ | 30.20 | 286,419 |
| Total | 102.03 | |

The $H_2S$ is removed from the hydrocracker effluent, a portion of the effluent is steam reformed in an ICI steam reformer, and the remainder of the effluent is steam reformed in a CRG steam reformer, as follows:

| | To CRG Reformer, Pounds per day | To ICI Reformer, Pounds per day |
|---|---|---|
| $H_2$ | 2,027 | |
| $C_1$ | 22,725 | |
| $C_2$ | 1,717 | |
| $C_3$ | 65,440 | |
| $C_4$ | 172,421 | |
| $C_5$ | 246,966 | |
| $C_6$ | 380,948 | 13,002 |
| $C_7+$ | | 286,419 |

550,000 m.³/day of the CRG reformer product, having the same composition as in Example I, is blended with 450,000 m.³/day of the ICI reformer product, having the same composition as in Example I, to produce 1,000,000 m.³/day of a finished town gas having the same heating value and flame speed as the finished town gas in Example I.

The remainder of the ICI reformer product, 167,800 m.³/day, is purified as in Example I to produce a hydrogen-rich gas which is passed to the hydrocracker.

Example III 3615 b.p.s.d. of a straight run naphtha from a Middle East crude oil, having a gravity of 56.7° API, comprising $C_7$ to $C_{11}$ hydrocarbons, and containing 770 p.p.m. sulfur, is hydrocracked on a $C_7+$ recycle basis, that is, those hydrocarbons in the effluent from the hydrocracker containing more than 6 carbon atoms are recycled to the hydrocracker. The hydrocracker is operated with the same catalyst and under the same conditions as in Example I.

The hydrocracker yields as follows:

| | Wt. percent of Hydrocracker/ Hydrocarbon Feed | Pounds per day |
|---|---|---|
| $H_2$ | | 3,389 |
| $H_2S$ | 0.08 | 760 |
| $C_1$ | 0.07 | 33,608 |
| $C_2$ | 0.40 | 3,802 |
| $C_3$ | 15.70 | 149,210 |
| $C_4$ | 42.20 | 401,062 |
| $C_5$ | 27.50 | 261,356 |
| $C_6$ | 16.98 | 161,375 |

The $H_2S$ is removed from the hydrocracker effluent, a portion of the effluent is steam reformed in an ICI steam reformer, and the remainder of the effluent is steam reformed in a CRG steam reformer, as follows:

| | To CRG Reformer, Pounds per day | To ICI Reformer, Pounds per day |
|---|---|---|
| $H_2$ | 3,389 | |
| $C_1$ | 33,608 | |
| $C_2$ | 3,802 | |
| $C_3$ | 149,210 | |
| $C_4$ | 401,062 | |
| $C_5$ | 83,683 | 171,673 |
| $C_6$ | | 161,375 |

550,000 m.³/day of the CRG reformer product, having the same composition as in Example I, is blended with 450,000 m.³/day of the ICI reformer product, having the same composition as in Example I, to produce 1,000,000 m.³/day of a finished town gas having the same heating value and flame speed as the finished town gas in Example I.

The remainder of the ICI reformer product, 245,700 m.³/day, is purified as in Example I to produce a hydrogen-rich gas which is passed to the hydrocracker.

Example IV 3605 b.p.s.d. of the straight run naphtha feed of Example III is hydrocracked on a once-through basis, that is with no recycle to the hydrocracking zone of unconverted products therefrom. The hydrocracker is operated with the same catalyst and under the same conditions as in Example I.

The hydrocracker yields are as follows:

| | Wt. percent of Hydrocracker/ Hydrocarbon Feed | Pounds per day |
|---|---|---|
| $H_2$ | | 1,915 |
| $H_2S$ | 0.08 | 758 |
| $C_1$ | 0.05 | 24,204 |
| $C_2$ | 0.28 | 2,654 |
| $C_3$ | 10.99 | 104,158 |
| $nC_4+iC_4$ | 29.54 | 279,967 |
| $C_5$ | 19.25 | 182,443 |
| $C_6$ | 11.89 | 112,688 |
| $C_7+$ | 30.09 | 286,179 |

The $H_2S$ is removed from the hydrocracker effluent, a portion of the effluent is steam reformed in an ICI steam reformer, and the remainder of the effluent is steam reformed in a CRG steam reformer, as follows:

|  | To CRG Reformer Pounds per day | To ICI Reformer, Pounds per day |
|---|---|---|
| $H_2$ | 1,915 | |
| $C_1$ | 24,204 | |
| $C_2$ | 2,654 | |
| $C_3$ | 104,158 | |
| $C_4$ | 279,967 | |
| $C_5$ | 182,443 | |
| $C_6$ | 93,709 | 18,979 |
| $C_7+$ | | 286,179 |

550,000 m.$^3$/day of the CRG reformer product, having the same composition as in Example I, is blended with 450,000 m.$^3$/day of the ICI reformer product, having the same composition as in Example I, to produce 1,000,000 m.$^3$/day of a finished town gas having the same heating value and flame speed as the finished town gas in Example I.

The remainder of the ICI reformer product, 176,750 m.$^3$/day, is purified as in Example I to produce a hydrogen-rich gas which is passed to the hydrocracker.

Example V 4000 b.p.s.d. of a straight run naphtha feed from Middle East crude oils, having a gravity of 59.0° API, boiling from 210° F. to 358° F., and containing 500 p.p.m. sulfur, is hydrocracked with the catalyst and under the conditions given in Example I The effluent from the hydrocracker, after hydrogen and hydrogen sulfide removal, is fractionated into a $C_4-$ fraction and a $C_5+$ fraction. The latter fraction is steam reformed in an ICI steam reformer. The effluent from the steam reformer containing about 18% CO is passed to a shift conversion zone to convert the CO to $CO_2$. The effluent from the shift conversion zone is a gas having a calorific value of 2960 Kcal./m.$^3$ (315 B.t.u./s.c.f.), and having the following composition:

| | Mol percent |
|---|---|
| $H_2$ | 66 |
| CO | 3 |
| $CO_2$ | 22 |
| $CH_4$ | 9 |

This low calorific gas is blended with about 13 vol. percent of LPG ($C_3$ and $C_4$) from the hydrocracker, to produce a finished town gas having a calorific value of 5140 Kcal./m.$^3$ (547 B.t.u./s.c.f.), and a flame speed of about 40.

Upon reading the present specification those skilled in the art will be aware that the various embodiments of the process of the present invention can be operated in an extremely flexible manner to produce fuel gas mixtures of of widely varying compositions, selected to fall at a desired point on the Wobbe number-flame speed diagram.

SUMMARY OF ADVANTAGES OF PROCESS OF THE PRESENT INVENTION

From the foregoing it may be seen that advantages achievable with the process of the present invention include the following:

(1) Increased flexibility of continuous steam reforming processes may be achieved, because hydrocarbon feeds having sufficiently low end points for steam reformers are obtainable in the hydrocracking stage from the higher end point feeds, while attaining concurrent desulfurization in the hydrocracking stage.

(2) Expensive desulfurization facilities performing no other function are eliminated.

(3) Existing steam reformer technology and know-how is usable.

(4) The hydrocracking stage produces $C_3$ hydrocarbons and LPG which may be used in enriching the hydrogen-rich, methane lean gas from a steam reformed operating under severe conditions. In appropriate situations this enrichment gas may be sufficient without the necessity for obtaining additional methane-rich gas from any additional gasification process producing methane-rich gas.

(5) A portion of the hydrogen-rich product gas from a steam reformer operating under severe condition can be purified and used to contribute to the hydrogen requirements of the hydrocracking stage.

(6) The low production of $C_1$ and $C_2$ hydrocarbon gases from the hydrocracking stage make the hydrocracking element in the process combination advantageous and attractive from both an investment cost and operating cost standpoint.

(7) Various fuel products can be obtained directly from the hydrocracking stage when one hydrocracking stage is used, and directly from each hydrocracking stage when more than one hydrocracking stage is used.

(8) The process can make high heating value fuel gas, high purity hydrogen and synthesis gases concurrently, for areas requiring high heating value fuel gas.

(9) The process can make medium heating value fuel gas, high purity hydrogen and synthesis gases concurrently, for areas requiring medium heating value fuel gas.

Although only specific modes of operation of the process of the present invention have been described, numerous variations could be made in those modes without departing from the spirit of the invention and all such variations that fall within the scope of the appended claims are intended to be embraced thereby.

What is claimed is:

1. A process for producing valuable gases from a hydrocarbon distillate which comprises catalytically hydrocracking said distillate at a temperature between 500 and 800° F., and a pressure between 500 and 3000 p.s.i.g. by contacting a mixture of said distillate and hydrogen with a catalyst containing a hydrogenation-dehydrogenation component selected from one of the Group VI or Group VIII metals or metal compounds in a hydrocracking zone, to obtain an effluent stream comprising effluent hydrocarbons and hydrogen sulfide, separating at least a portion of the hydrogen sulfide from said effluent hydrocarbons, separating said effluent hydrocarbons from said hydrocracking zone into fractions, including at least a first fraction and a second fraction containing substantial quantities of hydrocarbons having a higher molecular weight than the hydrocarbons in said first fraction and then gasifying at least a substantial portion of said first fraction in a gasification zone to a methane-rich gas, and steam reforming said second fraction in a steam reforming zone under severe reforming conditions to produce a hydrogen-rich gas.

2. A process in accordance with claim 1 wherein at least 35 volume percent of the hydrocarbon distillate is converted, per-pass through the catalytic hydrocracking zone, to products boiling below the initial boiling point of the hydrocarbon distillate.

3. A process as in claim 2, wherein said gasification zone is a steam reforming zone operating under mild reforming conditions to produce a methane-rich gas.

4. A process as in claim 2, wherein said gasification zone is a thermal hydrocracking zone.

5. A process as in claim 4, wherein said thermal hydrocracking zone is a Gas Recycle Hydrogenator.

6. A process as in claim 2, wherein at least a portion of said methane-rich gas is recovered as a high calorific value fuel gas.

7. A process as in claim 2, wherein at least a portion of said hydrogen-rich gas is supplied as a feed to synthesis-gas making facilities.

8. A process as in claim 2, wherein at least a portion of said methane-rich gas is combined with at least a portion of said hydrogen-rich gas to produce a medium calorific value fuel gas.

9. A process as in claim 2, wherein at least a portion of said hydrogen-rich gas is purified in at least one purification step and passed to said hydrocracking zone to supply at least a portion of the hydrogen requirements thereof.

10. A process as in claim 9, wherein said purification step is selected from the group consisting of a shift conversion step, a $CO_2$ removal step, a methanation step, and a liquid wash step for trace CO and $CO_2$ removal.

11. A process for producing valuable gases from a hydrocarbon distillate which comprises catalytically hydrocracking said distillate at a temperature between 500 and 800° F., and a pressure between 500 and 3000 p.s.i.g. by contacting a mixture of said distillate and hydrogen with a catalyst containing a hydrogenation-dehydrogenation component selected from one of the Group VI or Group VIII metals or metal compounds in a hydrocracking zone, to obtain an effluent stream comprising effluent hydrocarbons and hydrogen sulfide, separating at least a portion of the hydrogen sulfide from said effluent hydrocarbons, separating said effluent hydrocarbons from said hydrocracking zone into fractions, including at least a first fraction and a second fraction containing substantial quantities of hydrocarbons having a higher molecular weight than the hydrocarbons in said first fraction, steam reforming said first fraction in a first steam reforming zone under mild reforming conditions to produce a methane-rich gas, and steam reforming said second fraction in a second steam reforming zone under severe conditions to produce a hydrogen-rich gas.

12. A process as in claim 11, wherein at least a portion of said methane-rich gas is purified in at least one purification step to produce a high calorific value fuel gas.

13. A process as in claim 12, wherein said purification step is selected from the group consisting of a $CO_2$ removal step and a methanation step.

14. A process as in claim 11, wherein at least a portion of said hydrogen-rich gas is supplied as a feed to synthesis-gas making facilities.

15. A process as in claim 11, wherein at least a portion of said methane-rich gas is combined with at least a portion of said hydrogen-rich gas to produce a medium calorific value fuel gas.

16. A process as in claim 11, wherein at least a portion of said hydrogen-rich gas is purified in at least one purification step and passed to said hydrocracking zone to supply at least a portion of the hydrogen requirements thereof.

17. A process as in claim 16, wherein said purification step is selected from the group consisting of a shift conversion step, a $CO_2$ removal step, a methanation step, and a liquid wash step for trace CO and $CO_2$ removal.

18. A process for producing valuable gases from a hydrocarbon distillate which comprises catalytically hydrocracking said distillate at a temperature between 500 and 800° F., and a pressure between 500 and 3000 p.s.i.g. by contacting a mixture of said distillate and hydrogen with a catalyst containing a hydrogenation-dehydrogenation component selected from one of the Group VI or Group VIII metals or metal compounds in a hydrocracking zone, to obtain an effluent stream comprising effluent hydrocarbons and hydrogen sulfide, separating at least a portion of the hydrogen sulfide from said effluent hydrocarbons, separating said effluent hydrocarbons from said hydrocracking zone into fractions, including at least a first fraction and a second fraction containing substantial quantities of hydrocarbons having a higher molecular weight than the hydrocarbons in said first fraction, gasifying at least a substantial portion of said first fraction in a gasification zone to a methane-rich gas, steam reforming said second fraction in a steam reforming zone under severe conditions to produce a hydrogen-rich gas, and purifying and passing to said hydrocracking zone at least a portion of said hydrogen-rich gas, said purifying comprising the steps of shift conversion, $CO_2$ removal and final purification, said final purification being accomplished by a step selected from methanation for residual CO and CO and $CO_2$ conversion, and liquid wash for residual CO and $CO_2$ removal.

References Cited

UNITED STATES PATENTS

| | | | |
|---|---|---|---|
| 1,904,439 | 4/1933 | Freyermuth. | |
| 2,654,662 | 10/1953 | Gorin. | |
| 2,707,147 | 4/1955 | Shapleigh | 48—214 XR |
| 2,711,419 | 6/1955 | Milbourne et al. | 48—214 XR |
| 2,795,559 | 6/1957 | Whaley. | |
| 2,911,288 | 11/1959 | Viles | 48—196 XR |
| 3,074,783 | 1/1963 | Paull | 48—196 XR |
| 3,119,667 | 1/1964 | McMahon. | |
| 3,338,681 | 8/1967 | Kordesch | 48—196 XR |
| 3,351,563 | 11/1967 | Negra et al. | |
| 2,759,806 | 8/1956 | Pettyjohn et al. | 48—213 XR |
| 2,942,960 | 6/1960 | Gerhold | 48—214 XR |
| 3,025,149 | 3/1962 | Eastman | 48—213 XR |
| 3,103,423 | 9/1963 | Pearce | 48—197 XR |
| 3,178,272 | 4/1965 | Dent et al. | 48—213 |
| 3,363,024 | 1/1968 | Majumdar et al. | 48—213 XR |
| 3,458,299 | 7/1969 | Hass | 48—213 |

MORRIS O. WOLK, Primary Examiner

R. E. SERWIN, Assistant Examiner

U.S. Cl. X.R.

48—214

PO-1050
(5/69)

UNITED STATES PATENT OFFICE
CERTIFICATE OF CORRECTION

Patent No. __3,531,267__  Dated __September 29, 1970__

Inventor(s) __GEORGE D. GOULD__

It is certified that error appears in the above-identified patent and that said Letters Patent are hereby corrected as shown below:

Col. 3, line 19, after "heating" and before "of", insert --value--;

line 74, after "regeneration" and before "is", insert --, or non-continuous or cyclic, when periodic catalyst regeneration--.

Col. 4, line 48, "$C_nH_{2n+n}$" should read --$C_nH_{2n+2}$--.

Col. 10, line 31, "end product" should read --end point--.

Col. 15, line 21, "hydrogen" should read --hydrocarbon--;

line 50, "line 31" should read --line 131--.

Col. 18, line 56, "39.59" should read --39.29--.

Col. 19, line 66, "380,948" should read --180,948--.

Signed and sealed this 23rd day of March 1971.

(SEAL)
Attest:

EDWARD M. FLETCHER, JR.
Attesting Officer

WILLIAM E. SCHUYLER, JR.
Commissioner of Patents